(12) United States Patent
Aguirre et al.

(10) Patent No.: US 8,693,953 B2
(45) Date of Patent: Apr. 8, 2014

(54) OPTIMIZING USE OF NETWORK RESOURCES BY SMALL CELLS AND/OR USER DEVICES OF A VENUE (75) Inventors: Sergio Aguirre, Southlake, TX (US); Derek H. Bao, Concord, CA (US); Lalit Ratilal Kotecha, San Ramon, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 233 days.

(21) Appl. No.: 13/246,942

(22) Filed: Sep. 28, 2011

(65) Prior Publication Data

US 2013/0078925 A1   Mar. 28, 2013

(51) Int. Cl.
H04B 15/00   (2006.01)

(52) U.S. Cl.
USPC ......... 455/62; 455/63.1; 455/67.11; 455/450; 455/452.1; 455/509; 455/464; 455/566; 370/329; 370/341; 370/342

(58) Field of Classification Search
USPC ............ 455/62, 63.1, 450, 452.2, 456.1, 509, 455/67.11, 436, 442, 464, 557, 556.2, 566; 370/329, 331, 333, 341, 342
See application file for complete search history.

(56) References Cited

U.S. PATENT DOCUMENTS

| 7,650,152 | B2* | 1/2010 | Li et al. ...................... 455/452.1 |
| 8,068,466 | B2* | 11/2011 | Muharemovic et al. ...... 370/335 |
| 8,107,921 | B2* | 1/2012 | Fiatal ............................ 455/405 |
| 8,260,320 | B2* | 9/2012 | Herz .......................... 455/456.3 |
| 8,311,526 | B2* | 11/2012 | Forstall et al. ............. 455/414.3 |
| 8,369,867 | B2* | 2/2013 | Van Os et al. .............. 455/456.1 |
| 8,467,774 | B2* | 6/2013 | Ramer et al. ................ 455/414.1 |
| 8,478,299 | B2* | 7/2013 | Chatterjee .................. 455/456.2 |
| 8,478,667 | B2* | 7/2013 | Raleigh .......................... 705/34 |
| 2010/0058133 | A1* | 3/2010 | Lee ................................ 714/748 |
| 2012/0063404 | A1* | 3/2012 | Wagner et al. ................ 370/329 |

* cited by examiner

Primary Examiner — Marceau Milord (57) ABSTRACT

A device receives first information about a wireless communication service within a venue. The device further receives, from one or more small cells within the venue, second information about traffic load of the one or more small cells. The device generates third information based on the first information and the second information. The third information assigns network resources to one or more services provided to mobile devices, within the venue, via the small cells. The device transmits the third information to configure the one or more small cells.

21 Claims, 6 Drawing Sheets

| SCHEDULE ID 405 | | TIME 410 | SMALL CELL ID 415 |
|---|---|---|---|
| SERVICE ID 420 | SERVICE TYPE 425 | FREQUENCY BAND 430 | BANDWIDTH 435 |
| APN1 | MB | BAND 1 | BW1 |
| APN1 | MB | BAND 2 | DR2 |
| APPLICATION1 | UC | BAND 2 | SF3 |
| SERVICE1 | UC | BAND 3 | MCS4 |

OPTIMIZING USE OF NETWORK RESOURCES BY SMALL CELLS AND/OR USER DEVICES OF A VENUE

BACKGROUND

User devices (e.g., mobile phone devices), of subscribers of a cellular network, are able to use evolved multimedia broadcast multicast services (eMBMS) technology to receive multiple streams (e.g., video streams) while the user devices are within a venue (e.g., a stadium). Traditionally, the cellular network may provide the eMBMS via high-powered macro base stations (e.g., cell towers) that are outside the venue.

Furthermore, user devices are able to receive different types of content by using different frequency bands (e.g., an upper 700 megahertz (MHz) band and an advanced wireless services (AWS) band). However, after a user device receives one type of content by using a particular frequency band, the user device automatically receives another type of content by using the same particular frequency band.

DETAILED DESCRIPTION OF PREFERRED EMBODIMENTS

The following detailed description refers to the accompanying drawings. The same reference numbers in different drawings may identify the same or similar elements.

Service information may refer to feedback, provided by user devices within a venue, associated with eMBMS, unicast service, etc. For example, the service information may identify which applications and/or services are accessed by the user devices, levels of service quality received by the user devices, radio conditions present while receiving the services, and/or other types of information associated with the user devices. A level of service quality, received by a user device, may correspond to how often a service and/or application is available to be used, by the user device, relative to a period of time associated with a session to access the service and/or application. The radio conditions may correspond to signal strength, signal noise, a frequency band, etc. used by the user device to receive the services. The other types of information associated with the user devices may include for example, a rate and/or a pattern of movement of a user device within the venue. Service information may also refer to feedback provided by a test unit that is moved to different locations within the venue. The feedback provided by the test unit may include the same type of service information as provided by the user devices.

Traffic load information may refer to feedback, provided by small cells of a venue, associated with eMBMS, unicast service, etc. provided to user devices, within the venue. For example, the traffic load information may identify applications and/or services that are being provided via a small cell, frequency bands and/or bandwidth being used by the small cell, whether congestion is present within the small cell, etc.

An electronic service guide (ESG) may refer to information provided to a user device, of a user, to inform the user about content that is available. The ESG may include, for example, any variety or combination of information relating to the transmission of the content (e.g., media-based programs), such as program titles, program descriptions, program statistics (e.g., the number of times a video or program has been accessed or requested), program ratings, program reviews, program broadcast dates, program broadcast times, program broadcast channels, program images, program videos, and/or other types of information relating to media-based programs communicated to user devices in a wireless network. Media-based programs may include, for example, live programming associated with an event (e.g., a football game, a concert, etc.) at a venue, radio programs, television programs, videos, movies, and/or one or more other types of media-based programs. The user may select information (e.g., a program title) in the ESG for the user device to receive content (e.g., a media-based program) associated with the information.

Additionally, or alternatively, the ESG may include information which may be used to determine which type of frequency band should be used for which content in the ESG. In other words, the ESG may specify that a particular type of frequency band (e.g., an AWS band or an upper 700 MHz band) should be used to receive particular content identified in the ESG. Each type of the frequency band may support different types of services, including unicast services, eMBMS, etc.

One implementation, described herein, may allow an operator of a venue or a cellular network carrier to optimize a use of network resources by small cells of the venue. For example, a device may receive service information from user devices within a venue, and may receive traffic load information from small cells of the venue. The device may generate resource scheduling information based on the service information and the traffic load information. The resource scheduling information may specify configurations for the small cells. The small cells may be configured, and provide eMBMS and unicast services to the user devices, based on the resource scheduling information. Accordingly, the use of the network resources may be optimized.

Another implementation, described herein, may allow a user device to select which frequency band to use to deliver content selected from an ESG. For example, a user device may receive an ESG. The user device may display the ESG, and receive a selection of content, from the ESG. The user device may identify which type of frequency should be used to receive the content, and may use the frequency band to receive the content. As a result, the user device may efficiently use frequency bands for appropriate types of content that correspond to each one of the frequency bands.

Figure 1:
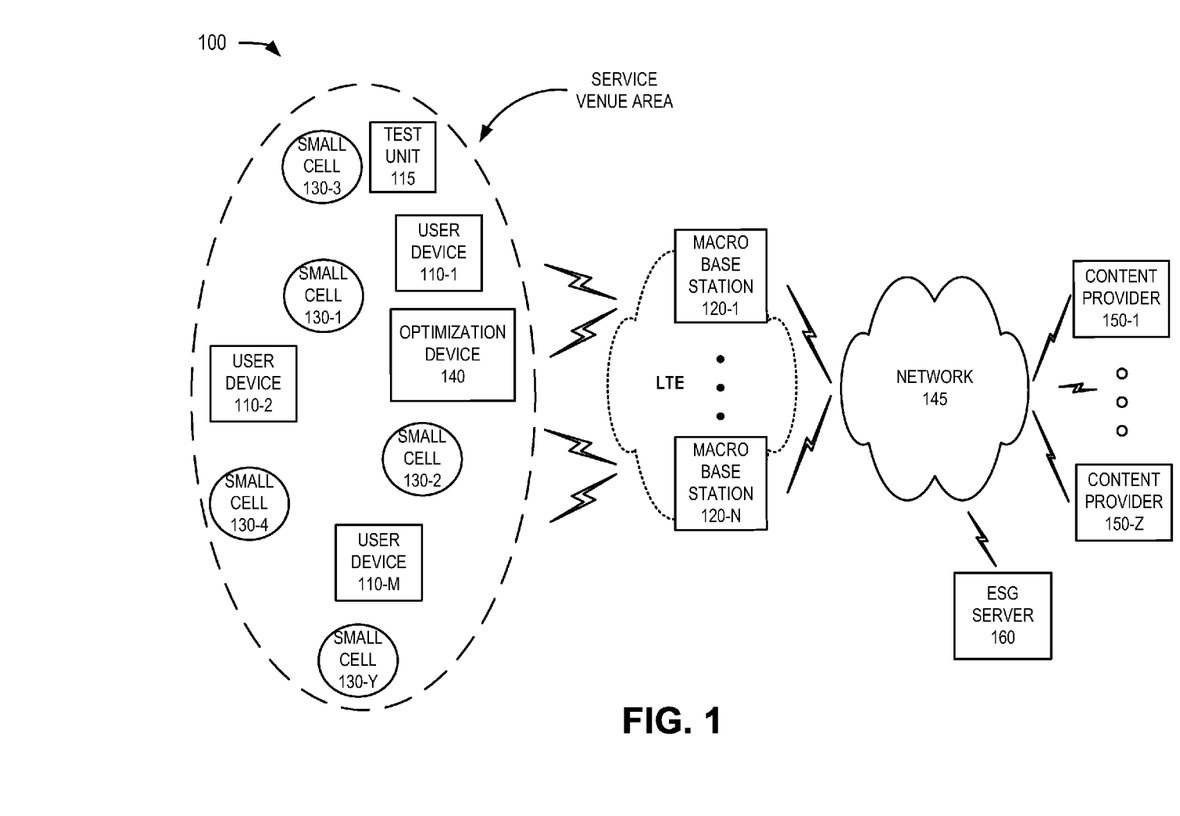
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include multiple user devices 110-1, ..., 110-M (where M≥1) (hereinafter referred to collectively as "user devices 110" and individually as "user device 110"); a test unit 115; multiple macro base stations 120-1, ..., 120-N (where N≥1) (hereinafter referred to collectively as "macro base stations 120" and individually as "macro base station 120"); multiple small cells 130-1, 130-2, . . . , 130-Y (referred to collectively as "small cells 130" or generically as "small cell 130"); an optimization device 140; a network 145; multiple content providers 150-1, . . . , 150-Z (where Z≥1) (hereinafter referred to collectively as "content providers 150" and individually as "content provider 150"); and/or an ESG server 160. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Environment 100 may include an evolved packet system (EPS) that includes a LTE network and/or an evolved packet core (EPC) that operate based on a third generation partnership project (3GPP) wireless communication standards. The LTE network may be a radio access network (RAN) that includes one or more macro base stations 120 that take the form of evolved Node Bs (eNBs) via which user devices 110 (e.g., outside of the service venue area) can communicate with the EPC.

User device 110 may include any computation or communication device, such as a wireless mobile communication device that is capable of communicating with small cell 130 and/or optimization device 140. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 110 may send traffic to and/or receive traffic from content provider 150 via macro base stations 120 and/or via small cells 130.

As shown in FIG. 1, user device 110 may be located inside of a service venue area. Examples of a service venue area may include a stadium, an arena, a golf course, a race track, an amusement park, a shopping center, or one or more other types of geographical areas where content may be provided as streams to multiple user devices 110 within the service venue area via small cells 130. In one example, a service venue area may be a football stadium where live content is broadcasted over a frequency band (e.g., the AWS band) that is dedicated to broadcasting the live content to user devices 110 within the service venue area.

User device 110 may collect service information associated with services received via small cells 130. User device 110 may periodically transmit the service information to optimization device 140 in response to, for example, requests from optimization device 140.

Additionally, or alternatively, user device 110 may receive an ESG. User device 110 may display a representation of the ESG. A user, of user device 110, may use user device 110 to select content identified in the ESG. User device 110 may identify a frequency band associated with the selected content. User device 110 may receive the selected content via the identified frequency band.

Test unit 115 may include any computation or communication device, such as a wireless mobile communication device that is capable of communicating with small cell 130 and/or optimization device 140. In one implementation, an operator of small cells 130, and/or the service venue area, may move test unit 115 around the service venue area to collect information associated with small cells 130 at different locations of the service venue area. The collected information may include levels of service quality and/or radio conditions measured by test unit 115 at the different locations. Test unit 115 may transmit the collected information to optimization device 140. Additionally, or alternatively, one of user devices 110 may include and/or perform functions of test unit 115 and/or test unit 115 may perform one or more functions of optimization device 140.

User device 110 and/or test client 115 may host a client application that collects service information that includes, for example, usage information, radio information, and/or service quality information based on communications with small cell 130. The usage information may, for example, identify an application and/or service that is accessed by user device 110, a frequency band via which the application is accessed by user device 110, a period of time when the application and/or service was accessed by user device 110, etc. The radio information may identify signal strength (e.g., a power level, a reference signal received power (RSRP) level, a relative signal strength indication (RSSI), etc.), signal quality (e.g., a reference signal receive quality), channel quality information (e.g., a channel quality indicator (CQI)), bandwidth usage, signal noise (e.g., a signal-to-interference noise ratio (SINR), etc.), etc. associated with communications with small cells 130. The radio information may also identify a presence of jitter, dropped packets, mis-ordered packets, delayed packets, etc. associated with the communications. The client application may cause user device 110 and/or test unit 115 to transmit the service information to optimization device 140.

Macro base station 120 may represent a base station designed to provide a wireless communication service to a relatively large geographic area and simultaneously serve a relatively large number of user devices 110 (i.e., the relatively large geographic area and the relatively large number of user devices 110 are greater than a size of a geographic area and a number of user devices 110, respectively, served by small cell 130) that are outside and/or inside the service venue area. Macro base station 120 may include one or more high-powered devices (e.g., with power levels equal to hundreds of kilowatts or megawatts), such as a cell tower. Macro base station 120 may receive, process, and/or transmit traffic, such as voice, video, text, and/or other data, destined for and/or received from user device 110.

In an example implementation, macro base station 120 may be an eNB associated with the LTE network that receives traffic (e.g., video or data streams) from content providers 150 via network 145. Macro base station 120 may forward the streams of traffic to user devices 110, outside the service venue area (not shown), via an air interface. One or more of macro base stations 120 may be associated with a RAN. The RAN may be associated with the LTE network. In another example, one or more other macro base stations 120 may be associated with a RAN that is not associated with the LTE network.

Small cell 130 may refer to a micro cell, a pico cell, a femtocell, and/or one or more other devices that may act as a macro base station for a limited set of user devices 110 and/or for a limited geographic area (e.g., the geographic area within the service venue area). Small cell 130 may establish a wireless communication session with user device 110 by using the same types of protocols as those of macro base station 120. Small cell 130 may include one or more low-powered devices (e.g., with power levels of less than 5 watts), such as a pico eNB. Small cell 130 may receive, process, and/or transmit traffic, such as voice, video, text, and/or other data, destined for and/or received from user device 110.

Small cell 130 may transmit traffic load information associated with traffic load conditions (e.g., hereinafter referred to as "traffic load information") to optimization device 140. The traffic load information may, for example, identify a quantity of bandwidth being processed by small cell 130, a quantity of bandwidth that is available relative to a bandwidth capacity of small cell 130 (e.g., a maximum quantity of bandwidth that can be processed, by small cell 130, relative to each frequency band, channel, etc.), and/or a quantity of applications and/or services being provisioned via small cell 130. The traffic load information may also identify a type of content being provisioned (e.g., unicast, multicast, broadcast, video, voice, text, etc.) via small cell 130, a quantity of user devices 110 being serviced by small cell 130, etc.

Small cell 130 may receive resource scheduling information that identifies bandwidth resources (e.g., frequency bands, quantities of bandwidth, resource blocks, etc.), and/or time resources (e.g., periods of time, quantity of subframes, etc.) that are allocated to provision applications and/or services to user devices 110 being serviced by small cell 130. The bandwidth resources may correspond to quantities of bandwidth (e.g., quantities of resource blocks) that identify a quantity of bits of traffic and/or a quantity of packets, within a period of time, that are permitted to be used, by small cell 130, to provision the applications and/or services. The time resources may correspond to periods of time (e.g., quantities of subframes) that are permitted to be used, by small cell 130, to provision the applications and/or services.

Additionally, or alternatively, the resource scheduling information may include information that identifies a modulation and coding scheme (MCS) (e.g., based on a MCS index) to be used to provision the applications and/or services. The MCS index may include a value that corresponds to a type of modulation (e.g., binary phase-shift keying (BPSK), quadrature phase-shift keying (QPSK), quadrature amplitude modulation (QAM), etc.), a data rate, a channel bandwidth, etc. to be used to provision the applications and/or services.

Optimization device 140 may include one or more devices, and/or other types of computation or communication devices, that gather, process, search, store, and/or provide information in a manner described herein. In one implementation, optimization device 140 may include a computer device (e.g., a server) that is separate from other devices and/or networks shown in FIG. 1. Optimization device 140 may be located inside or outside of the service venue area. In another implementation, small cell 130, macro base station 120, or test unit 115 may include optimization device 140.

Optimization device 140 may receive service information from user devices 110 or portions of the service information (e.g., levels of service quality and/or radio conditions) from test unit 115. Optimization device 140 may further receive traffic load information from small cells 130.

Optimization device 140 may generate resource scheduling information, for each small cell 130, based on one or more portions of the service information and/or the traffic load information. The resource scheduling information may, for example, identify a manner in which frequency bands (e.g., associated with quantities of bandwidth) are to be allocated to applications and/or services provisioned via small cells 130. The frequency bands may, for example, correspond to a PCS band, an AWS band, a cellular band, an upper 700 mega hertz (MHz) band, a lower 700 MHz band, and/or other bands identified by 3GPP standards, etc.

Optimization device 140 may, for example, generate resource scheduling information that causes a quantity of bandwidth, subframes, resource blocks, etc., used to provision an application and/or service (e.g., content), to increase or decrease based on the traffic load information and/or the service information. The quantity of bandwidth, subframes, resource blocks, etc. may be increased when the traffic load information indicates that a quantity of user devices 110, which are accessing the application and/or service, are greater than a first threshold. Optimization device 140 may, in another example, decrease a quantity of frequency bands assigned to an application and/or service when the traffic load information indicates that a quantity of bandwidth, subframes, and/or time slots, used to provision the application and/or service, is less than a second threshold. The thresholds and/or other predefined information used to generate resource scheduling information for small cells 130 may be customized based on information associated with the service venue area (e.g., a size of the service venue area, a quantity of small cells 130 within the service venue area, a quantity of user devices 110 within the service venue area, etc.).

In yet another example, optimization device 140 may increase a quantity of bandwidth, subframes, resource blocks, etc., to be used to provision an application and/or service, when the service information indicates that a period of time when the application was and/or was not available to one or more user devices 110 is greater than an third threshold. Optimization device 140 may use the service information to allocate small cells 130 to provision services, to user devices 110, with a level of signal quality that is greater than a signal quality threshold.

Optimization device 140 may, in a further example, generate resource scheduling information that causes an MCS, used to provision an application and/or service, to change based on the traffic load information and/or the service information. Causing the MCS to change may allow optimization device 140 to increase or decrease throughput (e.g., data rate), used to provision the application and/or service, within a fixed quantity of bandwidth (e.g., associated with a frequency band and/or channel).

In one implementation, an operator of small cells 130 and/or the service venue area may configure parameters of small cells 130 based on the resource scheduling information. In another implementation, optimization device 140 may transmit the resource scheduling information to small cells 130 and small cells 130 may configure themselves. Small cells 130 may provision an application and/or service based on the resource scheduling information.

Network 145 may include one or more wired and/or wireless networks. For example, network 145 may include a cellular network, a public land mobile network (PLMN), a second generation (2G) network, a third generation (3G) network, a fourth generation (4G) network, a fifth generation (5G) network, and/or another network. Additionally, or alternatively, network 145 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Network 145 may include one or more network devices (not shown in FIG. 1). For example, network 145 may include a serving gateway. The serving gateway may include one or more data processing and/or traffic transfer devices or network devices, such as a gateway, a router, a modem, a switch, a firewall, a network interface card (NIC), a hub, a bridge, a proxy server, an optical add-drop multiplexer (OADM), or some other type of device that processes and/or transfers traffic. The serving gateway may, for example, aggregate traffic received from one or more macro base stations 120 and may send the aggregated traffic via network 145. The serving gateway may also receive traffic via network 145 and may send the received traffic to user devices 110 via macro base stations 120. The serving gateway may further perform handoff operations between macro base stations 120 via which user devices 110, outside of the service venue area, are communicating.

Additionally, or alternatively, network 145 may include an Internet protocol (IP) multimedia subsystem (IMS) core. The IMS core may include a home subscriber server authentication, authorization, accounting (HSS/AAA) server. The HSS/AAA server may manage authentication, session initiation, account information, profile information, etc. associated with user devices 110.

Content provider 150 may include any type or form of content provider. For example, content provider 150 may include free television broadcast providers (e.g., local broadcast providers, such as NBC, CBS, ABC, and/or FOX), for-pay television broadcast providers (e.g., TNT, ESPN, HBO, CNN, etc.), and/or Internet-based content providers that stream content from web sites and/or permit content to be downloaded (e.g., via progressive download, etc.). Content provider 150 may include on-demand content providers (e.g., video on demand (VOD), pay per view (PPV), etc.). A media stream, as used herein, may refer to a stream of content that includes video content (e.g., a video stream), audio content (e.g., an audio stream), and/or textual content (e.g., a textual stream).

ESG server 160 may include one or more devices, and/or other types of computation or communication devices, that gather, process, search, store, and/or provide information in a manner described herein. In one implementation, ESG server 160 may receive a request for an ESG from user device 110. ESG server 160 may store, or otherwise have access to, ESG data. The ESG data may include content information associated with content identified in an ESG. ESG server 160 may further monitor network conditions associated with user device 110 and/or the service venue area. The network conditions may include one or more of a level of network activity, a level of network congestion, a period of time corresponding to peak network usage hours, a period of time corresponding to off-peak network usage hours, a location of user device 110 within the service venue area, etc.

Additionally, or alternatively, ESG server 160 may analyze network conditions and determine how content should be transmitted to user device 110. For instance, ESG server 160 may decide whether content should be transmitted to user device 110 via an eMBMS service or a unicast service. ESG server 160 may further allocate content to one or more radio frequency bands.

ESG server 160 may generate the ESG, for user device 110, based on the content information and/or the analyzed network conditions. The ESG may include, for example, program titles, program descriptions, program statistics (e.g., the number of times a video or program has been accessed), program ratings, program reviews, program broadcast dates, program broadcast times, program broadcast channels, images, videos, and/or other types of information relating to content. Additionally, or alternatively, the ESG may include information that indicates which frequency band to use for each particular content identified in the ESG. In response to the request, ESG server 160 may transmit the generated ESG to user device 110.

Figure 2:
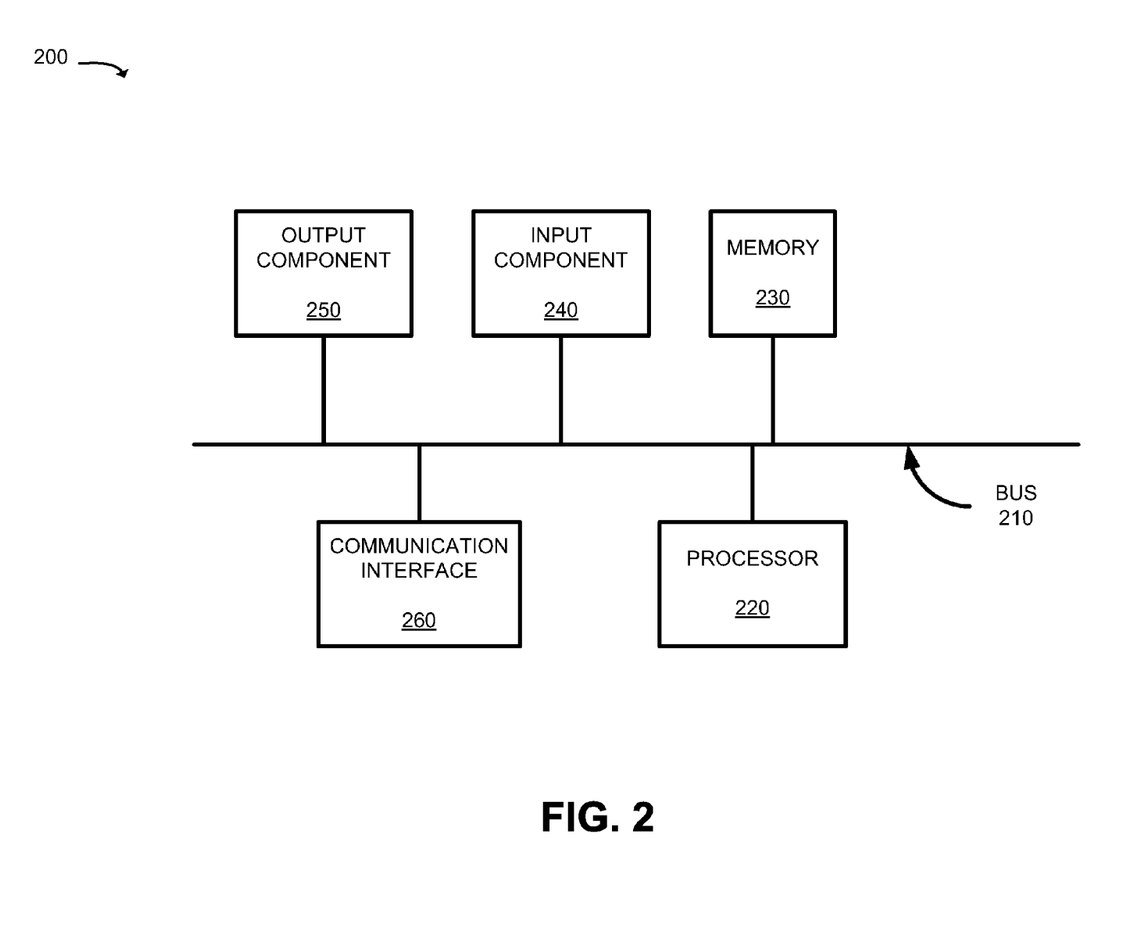
FIG. 2 is a diagram of example components of one or more of the devices of FIG. 1.

FIG. 2 is a diagram of example components of a device 200. Device 200 may correspond to user device 110, test unit 115, optimization device 140, content provider 150, and/or ESG server 160. Alternatively, or additionally, each of user device 110, test unit 115, optimization device 140, content provider 150, and/or ESG server 160 may include one or more devices 200 and/or one or more portions of device 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic (e.g., an ASIC or FPGA) that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 145. In one alternative implementation, communication interface 260 may be a logical component that includes input and output ports, input and output systems, and/or other input and output components that facilitate the transmission of data to other devices.

As described herein, device 200 may perform certain operations relating to dynamically allocating network resources. Device 200 may perform these and other operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
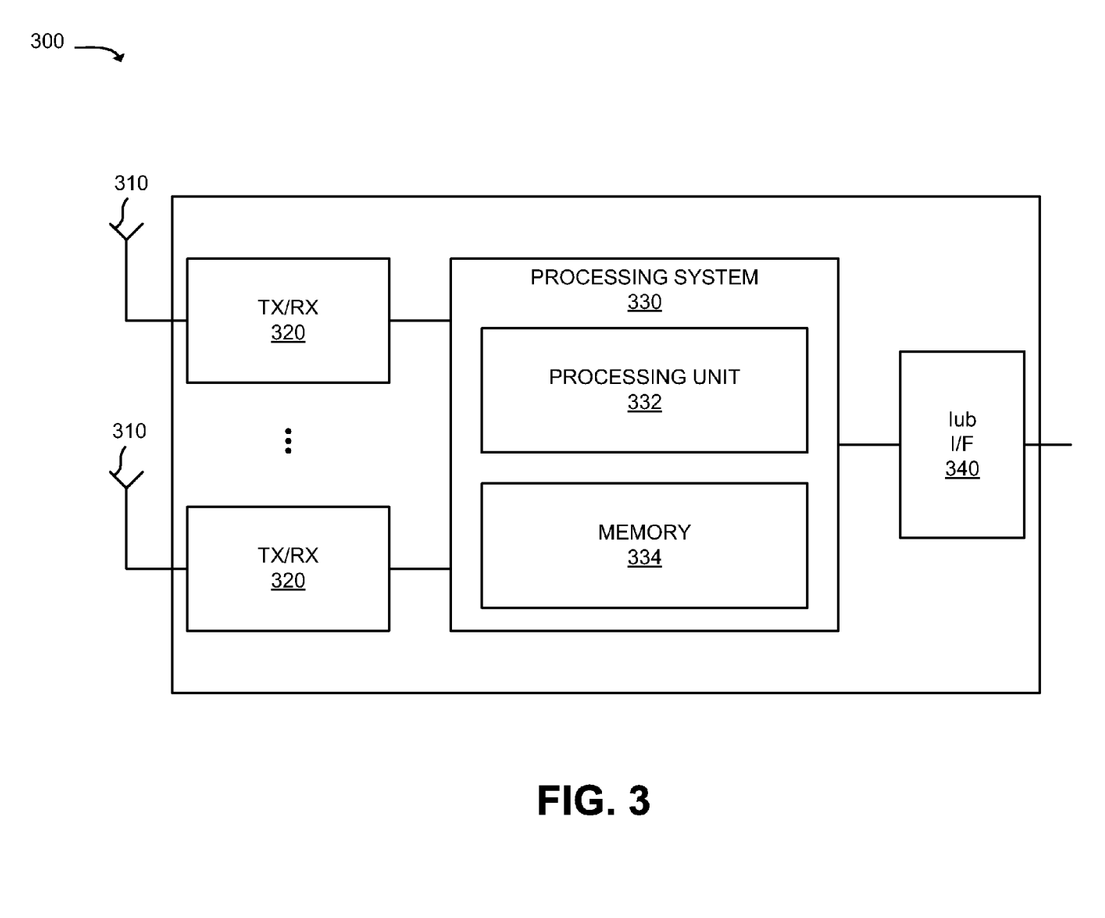
FIG. 3 is a diagram of example components of a macro base station or a small cell of FIG. 1.

FIG. 3 is a diagram of example components of device 300 that may correspond to one or more of macro base stations 120 or small cell 130. Alternatively, or additionally, device 300 may include one or more devices 300 and/or one or more portions of devices 300.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more tasks described as being performed by one or more other components of device 300.

As shown in FIG. 3, device 300 may include antennas 310, transceivers (TX/RX) 320, a processing system 330, and an Iub interface (I/F) 340. Antennas 310 may include one or more directional and/or omni-directional antennas. Transceivers 320 may be associated with antennas 310 and may include transceiver circuitry for transmitting and/or receiving symbol sequences in a network, such as network 145, via antennas 310.

Processing system 330 may control the operation of device 300. Processing system 330 may also process information received via transceivers 320 and Iub interface 340. Processing system 330 may further measure quality and strength of a connection, may determine a frame error rate (FER), and may provide this information to one or more other devices in environment 100. As illustrated, processing system 330 may include a processing unit 332 and a memory 334.

Processing unit 332 may include one or more processors, microprocessors, application specific integrated circuits (ASICs), field programmable gate arrays (FPGAs), or the like. Processing unit 332 may process information received via transceivers 320 and Iub interface 340. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 332 may transmit control messages and/or data messages, and may cause those control messages and/or data messages to be transmitted via transceivers 320 and/or Iub interface 340. Processing unit 332 may also process control messages and/or data messages received from transceivers 320 and/or Iub interface 340.

Memory 334 may include a random access memory (RAM), a read-only memory (ROM), and/or another type of memory to store data and instructions that may be used by processing unit 332.

Iub interface 340 may include one or more line cards that allow device 300 to transmit data to and receive data from, for example, network 145.

As described herein, device 300 may perform certain operations in response to processing unit 332 executing software instructions contained in a computer-readable medium, such as memory 334. The software instructions may be read into memory 334 from another computer-readable medium or from another device via antennas 310 and transceivers 320. The software instructions contained in memory 334 may cause processing unit 332 to perform processes described herein. Alternatively, hardwired circuitry may be used in place of or in combination with software instructions to implement processes described herein. Thus, implementations described herein are not limited to any specific combination of hardware circuitry and software.

Figure 4:
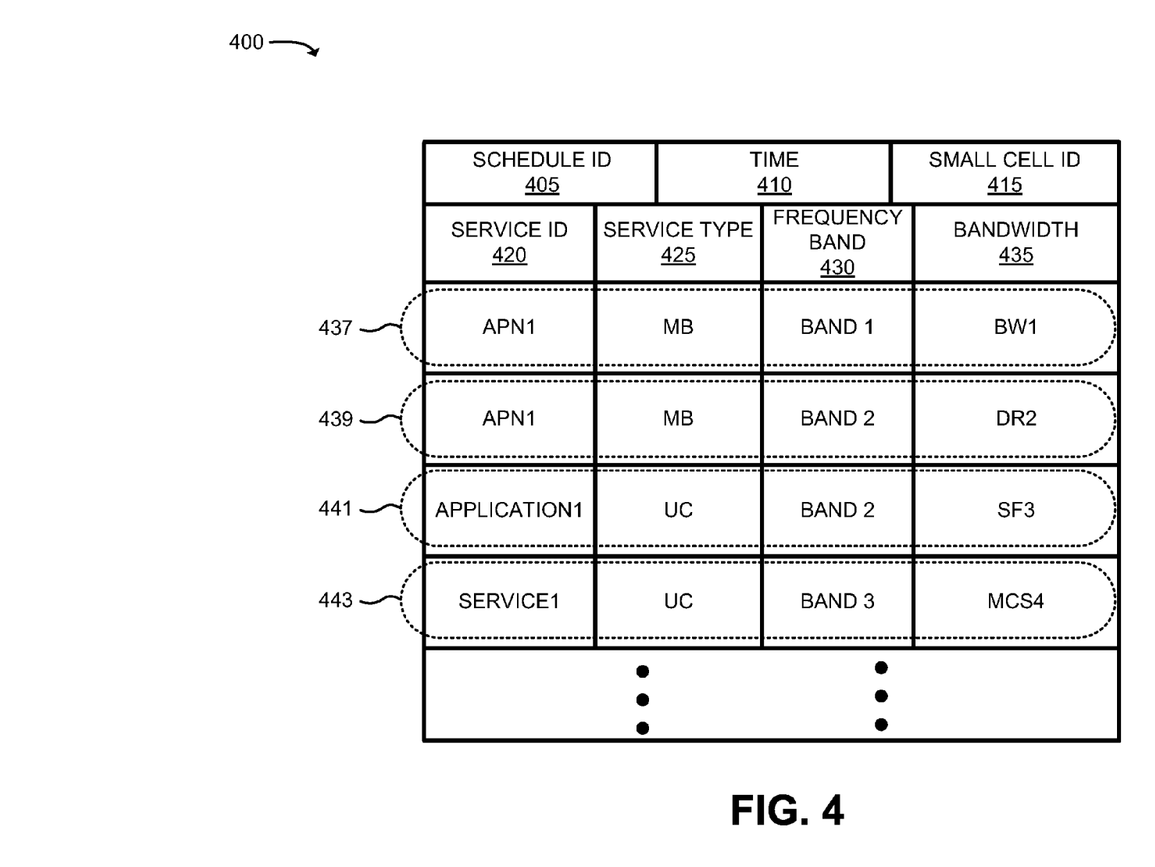
FIG. 4 is a diagram of an example data structure that stores resource scheduling information associated with small cell(s)

FIG. 4 is a diagram of an example data structure 400 that stores resource scheduling information used to optimize use of network resources (e.g., frequency bands) by one or more small cell(s) 130. Optimization device 140 may generate data structure 400, as described further below with reference to FIG. 5. Data structure 400 may be stored in a memory and/or storage device associated with small cell 130 and/or optimization device 140. In one implementation, optimization device 140 may provide data structure 400 to an operator of small cells 130. The operator may use the resource scheduling information, in data structure 400, to configure one or more small cell(s) 130. In another implementation, optimization device 140 may transmit data structure 400 to one or more small cell(s) 130. The one or more small cell(s) 130 may operate based on the resource scheduling information included in data structure 400.

As shown in FIG. 4, data structure 400 may include a collection of fields, such as a schedule identifier (ID) field 405, a time field 410, a small cell ID field 415, a service ID field 420, a service type field 425, a frequency band field 430, and/or a bandwidth field 435. Data structure 400 includes fields 405-435 for explanatory purposes. In practice, data structure 400 may include additional fields, fewer fields, different fields, and/or differently arranged fields than are described with respect to data structure 400.

Schedule ID field 405 may store information that uniquely identifies particular resource scheduling information, that is stored in data structure 400, from other scheduling information that was previously stored within other data structures 400. Time field 410 may store information that identifies a period of time during which the resource scheduling information is in effect and/or is to be used by a particular small cell 130 to provision applications and/or services to user devices 110 that are served by the particular small cell 130. Small cell ID field 415 may store information that identifies one or more particular small cells 130 to which the resource scheduling information, identified in schedule ID field 405, corresponds.

Service ID field 420 may store information that identifies one or more applications and/or services that are to be provisioned, by the particular small cell 130, to user devices 110 served by the particular small cell 130. Service type field 425 may store information that identifies a manner in which the applications and/or services are to be provisioned (e.g., via unicast services or eMBMS services) to user devices 110 that are served by the particular small cell 130.

Frequency band field 430 may store information that identifies a respective frequency band to be used to provision each of the applications and/or services. For example, the identified frequency bands may include two or more of a PCS band (e.g., 1.85-1.99 gigahertz (GHz)), an AWS band (e.g., 1.71 to 1.755 GHz), an upper 700 MHz band, a lower 700 MHz band, a cellular band (e.g., 850 MHz) and/or some other band (e.g., as identified by one or more 3GPP standards). In one example, small cell 130 may use an upper 700 MHz band for one or more streams of content that are provided outside of the service venue area (e.g., regionally or nationally). In another example, small cell 130 may use an AWS band to provide multiple streams (e.g., 8-10 different streams) of content that are provided only to user devices 110 (e.g., user devices 110-2, 110-3, and 110-4) that are within that service venue area.

Bandwidth field 435 may store information that identifies a respective quantity of bandwidth, a data rate, a quantity of subframes and/or time slots, and/or an MCS index to be used to provision each of the applications and/or services, based on the respective frequency bands identified in frequency band field 430. Optimization device 140, the operator of small cell 130, and/or small cell 130 may set parameters of small cell 130 based on the information in bandwidth field 435 to optimize use of the networking resources.

Optimization device 140 may, for example, obtain traffic load information, from each small cell 130 within the service venue area. Optimization device 140 may generate resource scheduling information, associated with one or more small cells 130, based on traffic load information obtained from small cell 130 and/or service information obtained from user devices 110 that are served by small cell 130 or from test unit 115.

The traffic load information may identify a quantity of bandwidth, a data rate, a quantity of subframes and/or time slots, and/or an MCS that is being processed by small cell 130. The traffic load information may also, or alternatively, identify a respective quantity of bandwidth, a data rate, a quantity of subframes and/or time slots, and/or an MCS being used, by small cell 130, to provision each application and/or service, and/or a capacity associated with small cell 130 (e.g., a maximum quantity of bandwidth, a data rate, and/or a maximum quantity of subframes and/or timeslots that can be processed, relative to each carrier band, channel, etc.). The traffic load information may also identify a quantity of applications and/or services being provisioned via small cell 130, a type of content being provisioned (e.g., unicast or eMBMS) via small cell 130, user devices 110 being served by small cell 130, etc.

Optimization device 140 may use the traffic load information and/or the service information to allocate processing resources associated with small cell 130. For example, optimization device 140 may store, within data structure 400, information associated with an application and/or service (e.g., APN1) and/or an indication that the application and/or service is to be provisioned as eMBMS content (e.g., MB) (e.g., as shown by ellipses 437 and 439). Optimization device 140 may store information that indicates that the application and/or service is to be provisioned using a first quantity of bandwidth (e.g., BW1) associated with a first frequency band (e.g., band 1) and/or a data rate (e.g., DR2) associated with a second frequency band (e.g., band 2) (e.g., as shown by ellipses 437 and 439, respectively).

Optimization device 140 may store, within data structure 400, information associated with other applications (e.g. appication1) and/or services (e.g., service1) and/or an indication that the applications and/or services are to be provisioned as unicast content (e.g., UC) (e.g., as shown by ellipses 441 and 443, respectively). Optimization device 140 may store resource scheduling information that indicates that the other applications and/or services are to be provisioned using a quantity of subframes and/or time slots (e.g., SF3) associated with the second frequency band (e.g., band 2) and/or a MCS index (e.g., MCS4) associated with a third frequency band (e.g., band 3) (e.g., as shown by ellipses 441 and 443, respectively).

Figure 5:
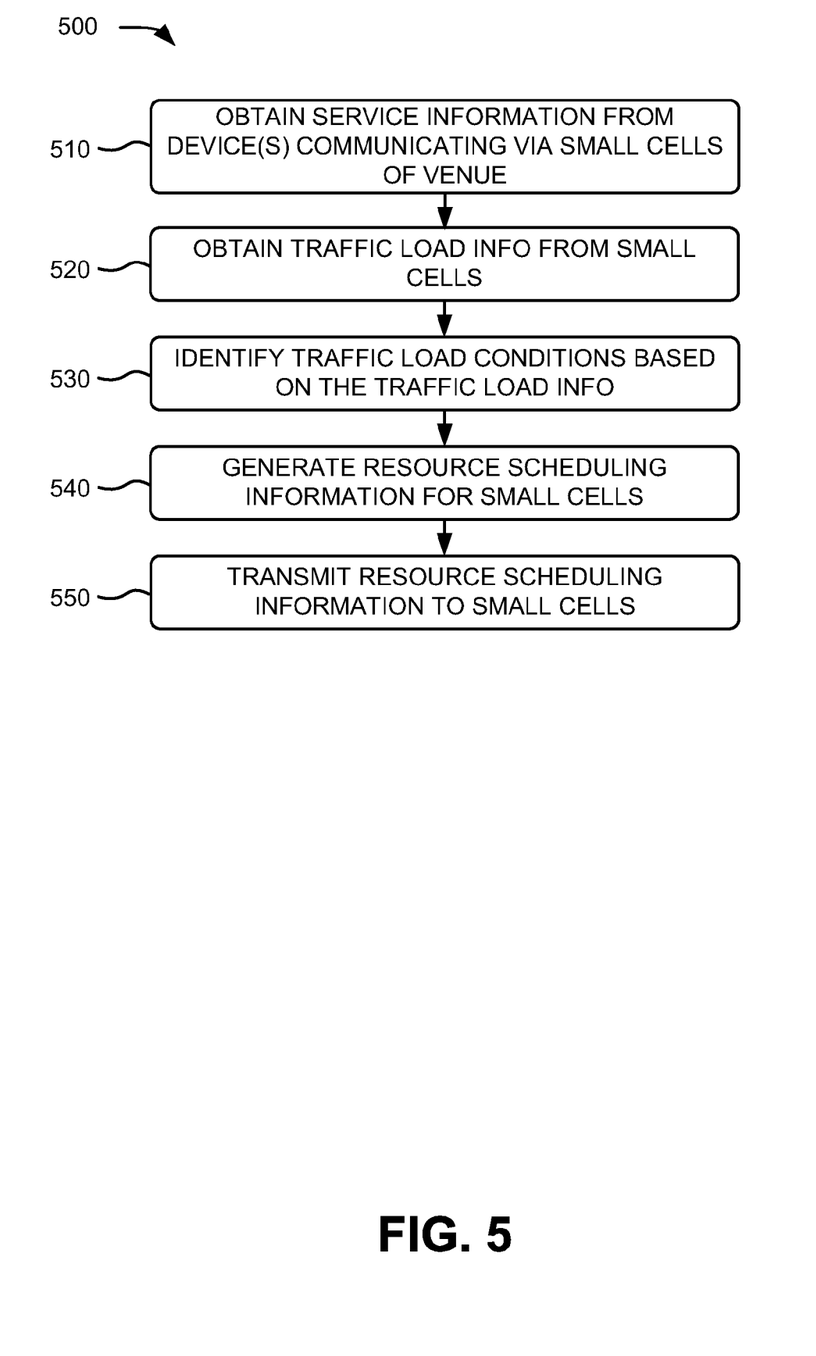
FIG. 5 is a flow chart of an example process for optimizing use of network resources by small cells.

FIG. 5 is a flow chart of an example process 500 for generating resource scheduling information. In one implementation, optimization device 140 may perform process 500. In another implementation, some or all of process 500 may be performed by a device or collection of devices separate from, or in combination with optimization device 140.

As shown in FIG. 5, process 500 may include obtaining service information from one or more devices communicating via small cells of a venue (block 510). In one implementation, an operator, of small cells 130 and/or the service venue area, may move test unit 115 to different locations of the service venue area. At each location, test unit 115 may collect and/or determine data associated with a service provided by one or more small cells 130 within the service venue area. The data may include, for example, a level of signal quality, a power level, a signal-to-noise ratio, a level of channel isolation, etc. associated with a signal being received, from small cell 130, at a particular location. Test unit 115 may transmit the data, as service information, to optimization device 140. Optimization device 140 may receive the service information from test unit 115 as test unit 115 is moved to different locations.

In another implementation, optimization device 140 may determine that service information is to be obtained from one or more user devices 110 that are communicating via small cells 130 that are within the service venue area. Optimization device 140 may obtain the service information, from user devices 110, on a predetermined time (e.g., based on a particular time of the day, etc.), a time interval (e.g., every third minutes, one hour, two hours, six hours, etc.), as a result of an occurrence of some event (e.g., an indication that small cell 130 is congested), etc. Based on the determination that the service information is to be obtained, optimization device 140 may transmit a request, to user devices 110 (e.g., via small cells 130), to obtain the service information from each of user devices 110. User devices 110 may receive the request.

In response to the requests, user device 110 may collect and/or determine data associated with a service provided by one or more small cells 130. The data may include, for example, a level of signal quality, a power level, a signal-to-noise ratio, a level of channel isolation, etc. associated with a signal being received, from small cell 130, by user device 110. In one example, user device 110 may determine the level of service quality associated with via small cell 130. Additionally, or alternatively, the data may include a period of time during which the application has been available to be used by user device 110 (e.g., when the application has not stalled, is not downloading, is not restarting, is not malfunctioning, etc.), relative to another period of time associated with accessing the application. The data may further include, for example, a quantity of dropped packets, a quantity of misordered packets, a presence of jitter, etc. associated with accessing the application.

Additionally, or alternatively, in response to the request, user device 110 may determine usage information associated with accessing the application. The usage information may include, for example, the application that is being accessed, an identifier of small cell 130 via which the application is being accessed, a frequency band being used to access the application, the other time period when the application is being accessed, a location associated with user device 110, etc. User device 110 may transmit the data and the usage information, as the service information, to optimization device 140. Optimization device 140 may receive the service information from user device 110. Optimization device 140 may also receive other service information from other user devices 110 communicating via this or other small cells 130.

Process 500 may further include obtaining traffic load information from the small cells (block 520). For example, each small cell 130 may include a scheduler that gathers traffic load information. Optimization device 140 may determine that traffic load information is to be obtained from one or more small cells 130 within the service venue area. Optimization device 140 may obtain the traffic load information based on a predetermined time (e.g., a particular time of the day, etc.), a time interval (e.g., every thirty minutes, one hour, two hours, six hours, etc.), as a result of an occurrence of some event (e.g., an indication that small cell 130 is congested), etc. Based on the determination that the traffic load information is to be obtained, optimization device 140 may transmit an instruction, to small cell 130, to send traffic load information to optimization device 140. Small cell 130 may receive the instruction and may transmit, to optimization device 140, the traffic load information. Optimization device 140 may receive the traffic load information from small cells 130.

Process 500 may also include identifying traffic load conditions based on the traffic load information (block 530). For example, optimization device 140 may use the traffic load information to identify applications and/or services that are being provisioned via small cells 130. For each small cell 130, optimization device 140 may use the traffic load information to identify a respective quantity of user devices 110, being served by small cell 130, that are accessing each of the applications and/or services. Optimization device 140 may use the traffic load information to identify a respective one or more frequency bands, a respective quantity of bandwidth, a respective data rate, a respective quantity of subframes and/or time slots, and/or a respective MCS index, used by small cell 130, to provision each application and/or service. Optimization device 140 may use the traffic information to identify a manner in which small cell 130 is to provision the applications and/or services (e.g., as unicast or eMBMS). Optimization device 140 may use the traffic load information to determine a quantity of bandwidth, a data rate, a quantity of subframes and/or time slots, and/or an MCS index being processed by small cells 130 relative to each frequency band.

Optimization device 140 may further use the traffic load information to determine whether small cells 130, within the service venue area, are congested and/or have reached capacity. In one example, for each small cell 130, optimization device 140 may determine that a quantity of user devices 110, being served by small cell 130, is greater than a device threshold associated with small cell 130. Based on the determination that the quantity of user devices 110, being served by small cell 130, is greater than the device threshold, optimization device 140 may determine that small cell 130 has reached capacity.

In another example, for each small cell 130, optimization device 140 may determine that a quantity of bandwidth, data rate, and/or a quantity of subframes and/or time slots, that is being used to provision an application and/or service, is greater than a maximum threshold associated with a frequency band. Based on the determination that the quantity of bandwidth, the data rate, and/or the quantity of subframes and/or time slots is greater than the maximum threshold, optimization device 140 may determine that the frequency band, used to provision the application and/or service, has reached capacity.

Process 500 may also include generating resource scheduling information for the small cells (block 540). For example, optimization device 140 may generate resource scheduling information based on the service information, the traffic load information, and/or the identified traffic load conditions. The resource scheduling information may specify configuration parameters for small cell 130 to use to provision applications and/or services to user devices 110 during a particular period of time. The resource scheduling information may assign resources (e.g., bandwidth, data rates, subframes and/or time slots, MCS indices, carrier frequencies, processing capacity, etc.) in a manner that allows small cell 130 to provision the applications and/or resources without becoming congested and/or in a manner that enable user devices 110 to access the applications and/or services without experiencing low service quality and/or low signal quality.

Optimization device 140 may generate resource scheduling information that increases bandwidth resources (e.g., associated with a quantity of frequency bands, a data rate, a quantity of resource blocks) and/or time resources (e.g., periods of time, a quantity of subframes) to be used to provision an application and/or service. Optimization device 140 may, for example, cause the number of frequency bands to increase (e.g., relative to another number of frequency bands previously used to provision the application) when the traffic load information indicates that a quantity of user devices 110 accessing the application and/or service is greater than a threshold.

Optimization device 140 may, in another example, generate resource scheduling information that increases the bandwidth resources and/or time resources when the traffic load information indicates that a quantity of bandwidth, a data rate, a quantity of subframes and/or time slots, etc., used by small cell 130 to provision the application and/or service, is greater than another threshold. Optimization device 140 may also, or alternatively, modify a MCS index when the traffic load information indicates that a quantity of bandwidth, a data rate, a quantity of subframes and/or time slots, etc., used by small cell 130 to provision the application and/or service, is greater than the other threshold. Modifying the MCS index may increase a quantity of throughput, associated with provisioning the application and/or service, without increasing a quantity of bandwidth used to provision the application and/or service.

Optimization device 140 may generate resource scheduling information that causes small cell 130 to provision an application in a manner that allows the user devices 110 to access the application without experiencing low service quality (e.g., as identified by the service information). In this example, optimization device 140 may generate resource scheduling information that assigns bandwidth resources (e.g., a quantity of bandwidth, a quantity of resource blocks, a number of frequency bands, etc.), time resources (e.g., periods of time, a quantity of subframes, etc.), and/or a MCS index to the application. Assigning the bandwidth resources, time resources, and/or the MCS index may allow small cell 130 to provision the application, to user devices 110, in a manner that causes the level of service quality, received by the user devices 110, to be greater than a service threshold. The assigned bandwidth resources, time resources, and/or MCS index may be greater than other bandwidth resources, time resources, and/or MCS index that was previously used, by small cell 130, to provision the application when user devices 110 were experiencing low service quality.

Optimization device 140 may generate resource scheduling information that causes small cell 130 to transmit a service, which was previously transmitted as eMBMS content, as unicast content when service information indicates that a period of time that the service was available, to a group of user devices 110, is less than an availability threshold. The unicast content may use less bandwidth, fewer subframes and/or time slots, a lower data rate, and/or a different MCS index than the eMBMS content, which may allow optimization device 140 to assign additional bandwidth and/or other resources to another service and/or application.

In one implementation, when the service information is obtained from user devices 110, optimization device 140 may generate resource scheduling information that causes small cell 130 to provision a particular application and/or service that user device 110 has previously accessed. Optimization device 140 may determine that user device 110 has previously accessed the particular application and service based on previous service information obtained from user device 110 and/or information associated with a usage history associated with user device 110. Optimization device 140 may assign bandwidth resources (e.g., a quantity of bandwidth, a quantity of resource blocks, one or more frequency bands, etc.), time resources (e.g., period of time, a quantity of subframes, etc.), and/or a MCS index, to the particular application, which may enable small cell 130 to provision the particular application and/or service when user device 110 requests to access the particular application and/or service.

Optimization device 140 may generate resource scheduling information that causes small cell 130 to provision an application using a particular frequency band. Optimization device 140 may generate the resource scheduling information, which may cause small cell 130 to provision the application, when service information, associated with another small cell 130, indicates that a level of signal quality, received by other user devices 110 while accessing the application via the other small cell 130, is less than a signal threshold. Provisioning the application and/or service, by small cell 130, using the particular frequency band, may allow the other user devices 110 to access the application and/or service at a signal strength (e.g., a signal power level, RSRP level, RSSI, SINR, etc.) that is greater than the signal threshold.

Process 500 may also include transmitting the resource scheduling information to the small cells (block 550). In one implementation, optimization device 140 may transmit a data structure (e.g., data structure 400 of FIG. 4) that represents/includes the resource scheduling information to one or more small cells 130. In another implementation, optimization device 140 may store respective resource scheduling information, for each small cell 130, in a different data structure (e.g., data structure 400). Optimization device 140 may transmit respective resource scheduling information, to each small cell 130. A particular small cell 130 may use the resource scheduling information to provision applications and/or services to user devices 110 that are serviced by the particular small cell 130. Provisioning the applications and/or services using the respective resource scheduling information, may enable small cells 130 to avoid becoming congested. Provisioning the applications and/or services, using the respective resource scheduling information, may enable user devices 110 to access the applications and/or services at a level of service quality and/or signal quality that is greater than the service threshold and/or signal threshold.

In yet another implementation, optimization device 140 and/or the operator of small cells 130, within the service venue area, may set parameters of one or more small cells 130 based on the resource scheduling information. The parameters may instruct the one or more small cells 130 to provision applications and/or services to user devices 110 by using information included in the resource scheduling information.

In other embodiments, optimization device 140 may configure macro base stations 120 in a process similar to process 500. For example, optimization device 140 may receive service information from user devices 110 and traffic load information from macro base stations 120. Optimization device 140 may generate resource scheduling information, for macro base stations 120, based on the service information and the traffic load information. Optimization device 140 may configure parameters of macro base stations 120 based on the resource scheduling information. The thresholds, etc. used to generate the resource scheduling information for macro base stations 120 may be different from the thresholds used to generate resource scheduling information for small cells 130.

Figure 6:
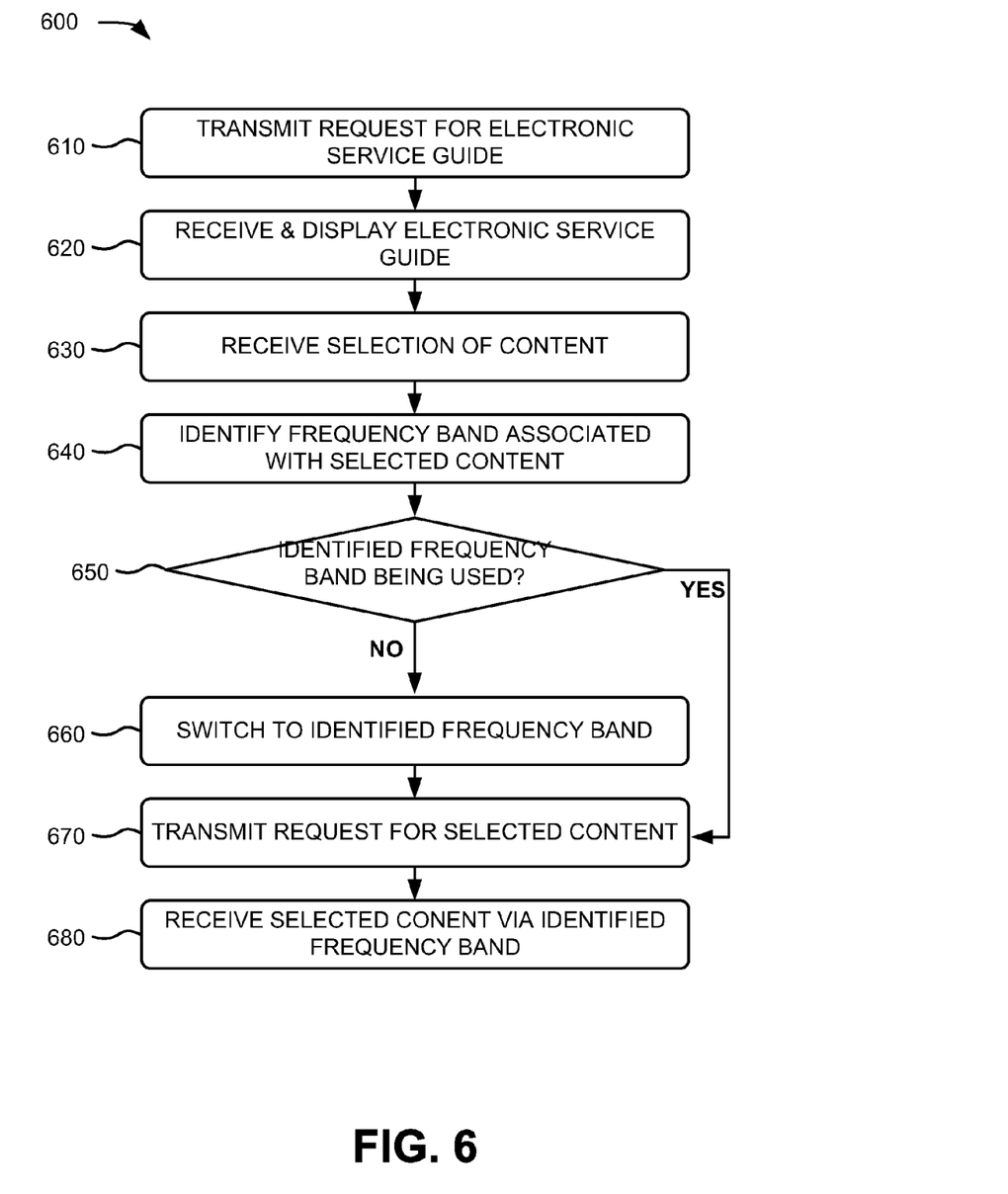
FIG. 6 is a flow chart of an example process for receiving content via an identified frequency band to optimize network resources.

FIG. 6 is a flow chart of an example process for receiving content via an identified frequency band to optimize network resources. In one implementation, user device 110 may perform process 600. In another implementation, some or all of process 600 may be performed by a device or collection of devices separate from, or in combination with user device 110.

Process 600 may include transmitting a request for an electronic service guide (ESG) (block 610) and receiving and displaying the ESG (block 620). For example, a user of user device 110, located within or outside of the service venue area, may use user device 110 to select to receive an ESG. In response, user device 110 may transmit a request for the ESG to ESG server 160. ESG server 160 may receive the request for the ESG, and may generate the ESG in response to the request. The ESG may include information about programming that is available to be received by user device 110.

Two or more different frequency bands may be used to transmit the content to user device 110. A frequency band which is used for particular content may depend on a type of distribution of the particular content and/or other information associated with the particular content. For example, an upper 700 MHz frequency band may be used for eMBMS content that includes video streams that are distributed regionally or nationally (i.e., outside of the service venue area). An AWS frequency band may be used for eMBMS content that includes video streams that are distributed only within the service venue area and for unicast services. ESG server 160 may associate each content (e.g., programming), in the ESG, with a particular frequency band (e.g., the upper 700 MHz frequency band or the AWS frequency band). ESG server 160 may include information about the associated frequency bands in the ESG. ESG server 160 may transmit the ESG to user device 110 via a first frequency band (e.g., the upper 700 MHz frequency band) and/or via a second frequency band (e.g., the AWS frequency band). User device 110 may display a representation of the ESG.

Process 600 may further include receiving a selection of content (block 630), identifying a frequency band associated with the selected content (block 640), and determining whether the identified frequency band is being used (block 650). For example, user device 110 may detect a selection of content when a user uses user device 110 to select content from the ESG. The user may select the content by selecting an identifier associated with the content. For example, the user may use user device 110 to select a channel or a title associated with a program (i.e., the content).

User device 110 may use the ESG to identify a frequency band associated with the selected content. For example, a user may be using user device 110 within the service venue area, which is a football stadium, while watching a football game occurring within the service venue area. The user may select to view video streams, of content, which include a view of the football game from a particular camera angle. The selected content may not be distributed outside of the service venue area. The ESG may specify that the AWS frequency band is associated with the selected content. User device 110 may identify the AWS frequency band in response to the selection of the selected content by the user. Thereafter, user device 110 may determine whether user device 110 is currently using the identified frequency band.

If the identified frequency band is not being used (block 650—NO), process 600 may include switching to the identified frequency band (block 660). For example, user device 110 may be set to receive streams of data via the upper 700 MHz frequency band. Accordingly, after identifying the AWS frequency band, user device 100 may determine that the identified frequency band is not being used because the upper 700 MHz frequency band is different from the identified AWS frequency band. In response, user device 110 may initiate an inter-frequency handoff in order to switch user device 110 from receiving data via the upper 700 MHz frequency band to start receiving data via the identified AWS frequency band.

If the identified frequency band is being used (block 650—YES) or after switching to the identified frequency band (block 660), process 600 may include transmitting a request for the selected content (block 670) and receiving the selected content via the identified frequency band (block 680). For example, after user device 110 determines that the identified frequency is being used or after switching to the identified frequency band, user device 110 may transmit a request for the selected content. Thereafter, user device 110 may receive the selected content via the identified frequency band. User device 110 may display a representation of the received content on a screen of user device 110 or on a screen connected to user device 110.

Systems and/or methods, described herein, may enable an optimization of network resources used by small cells 130, within the service venue area, based on service information, collected by test unit 115 or user devices 110, within the service venue area, and traffic load information collected by small cells 130. Other systems and/or methods, described herein, may enable an optimization of network resources used to provide content to user devices 110 by allowing user devices 110 to select to use particular frequency bands for content selected from an ESG. As a result, small cells 130 and/or user devices 110 may use the network resources more efficiently, and a quality of service provided to user devices 110, via small cells 130, may improve.

The foregoing description of implementations provides illustration and description, but is not intended to be exhaustive or to limit the possible implementations to the precise form disclosed. Modifications and variations are possible in light of the above teachings or may be acquired from practice.

For example, while series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions of the system implementations may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   displaying, by a computing device, a guide, where the guide comprises information about content that is available to the computing device within a venue;
   receiving, by the computing device via one or more small cells in the venue, a selection of the content;
   identifying, by the computing device, a first frequency band allocated to the content when network conditions associated with a traffic load of the one or more small cells indicate that one or more traffic load values exceed corresponding threshold values related to at least one of:
      a size of the venue,
      a quantity of the one or more small cells, or
      a quantity of computing devices receiving wireless communication service via the one or more small cells;
   determining, by the computing device, that a second frequency band is being used by the computing device, the second frequency band being different than the first frequency band;
   switching, by the computing device, from the second frequency band to the first frequency band when the first frequency band is not being used by the computing device; and
   receiving, by the computing device, the content via the first frequency band.

2. The method of claim 1,
   where the first frequency band is an advanced wireless services (AWS) band, and
   where the second frequency band is an upper 700 megahertz band.

3. The method of claim 2,
   where the computing device is within a venue, and
   where the content is only distributed within the venue.

4. The method of claim 1, where displaying the guide comprises:
   transmitting a request for the guide; and
   receiving the guide, in response to the request, via the first frequency band, via the second frequency band, or via the first frequency band and the second frequency band.

5. The method of claim 1,
   where the guide further comprises:
      information about different content,
      an association of the content to the first frequency band, and
      an association of the different content to the second frequency band,
   where the identifying the first frequency band comprises:
      identifying the first frequency band based on the guide.

6. The method of claim 1, where receiving the content via the first frequency band comprises:
   transmitting a request for the content,
   receiving the content, from a small cell, via the first frequency band, and
   displaying a representation of the content on a screen of the computing device.

7. A device comprising:
   a memory to store instructions; and
   a processor to execute one or more of the instructions to:
      receive first information about a wireless communication service received within a venue,
      receive, from one or more small cells within the venue, second information about traffic load of the one or more small cells, identify conditions associated with the traffic load of the one or more small cells when one or more values from the second information exceed corresponding threshold values related to at least one of:
- a size of the venue,
- a quantity of the one or more small cells, or
- a quantity of mobile devices receiving the wireless communication service via the one or more small cells, generate third information based on the identified conditions, the first information, and the second information, wherein the third information assigns network resources to one or more services provided to the mobile devices; and transmit the third information to configure the one or more small cells.

8. The device of claim 7, where each one of the one or more small cells comprises one of:
- a micro cell,
- a pico cell,
- a femtocell, or
- a pico evolved Node B (eNB).

9. The device of claim 7, where, when receiving the first information, the processor is to:
- receive the first information from each one of the mobile devices, or
- receive the first information from a test device that is moved to different locations within the venue.

10. The device of claim 7, where the first information comprises one or more of:
- information associated with the services accessed by the mobile devices,
- information associated with signal strength,
- information associated with signal quality,
- information associated with bandwidth usage, or
- information associated with signal noise.

11. The device of claim 10, where the information associated with the signal quality comprises one or more of:
- a power level, reference signal received power (RSRP) level, or relative signal strength indication (RSSI) associated with a signal that is being received by one of the mobile devices,
- a signal-to-interference noise ratio (SINR) associated with the signal, or
- a measure of channel isolation associated with the signal.

12. The device of claim 7, where the second information comprises one or more of:
- one or more frequency bands used by each one of the one or more small cells,
- one or more quantities of bandwidth used by each one of the one or more small cells, or
- one or more quantity of subframes or time slots used by each one of the one or more small cells.

13. The device of claim 7, where the third information comprises one or more of:
- a frequency band to be used for a particular service of the one or more services,
- a quantity of bandwidth to be used for the particular service,
- a data rate to be used for the particular service,
- a quantity of subframes or time slots to be used for the particular service, or
- a modulation and coding scheme (MCS) index to be used for the particular service.

14. One or more non-transitory computer-readable media comprising:

instructions, which when executed by one or more processors of a computing device, cause the one or more processors to:
- obtain, from user devices within a venue, first information that identifies services that are being accessed by the user devices,
- obtain, from small cells within the venue, second information that identifies traffic loads of the small cells, wherein the user devices receive the services via the small cells,
- identify conditions associated with the traffic load of at least one of the small cells when one or more values from the second information exceed corresponding threshold values related to at least one of:
  - a size of the venue,
  - a quantity of the at least one of the small cells, or
  - a quantity of the user devices,
- generate third information based on identified conditions, the first information,. and the second information, wherein the third information specifies a quantity of bandwidth to be used, by at least one of the small cells, to provide one of the services to one or more the user devices, and
- transmit the third information to one or more of the small cells.

15. The media of claim 14, where, when obtaining the first information, the instructions cause the one or more processors to:
- transmit a request for the first information to the user devices, and
- receive the first information from the user devices, where the first information comprises a signal quality associated with accessing one of the services.

16. The media of claim 14, where the venue is one of:
- a stadium,
- an arena,
- a golf course,
- a race track,
- an amusement park, or
- a shopping center, where one of the services comprises providing video streams of content to at least one of the user devices, and
- where the content is associated with an event occurring within the venue.

17. The media of claim 14, where the first information further comprises at least one of:
- a rate of movement of one of the mobile devices within the venue, or
- a pattern of the movement.

18. The media of claim 14, where the third information comprises one or more of:
- a time period during which the third information is to be used by the one or more of the small cells,
- a frequency band to be used for a particular service of the services,
- a quantity of bandwidth to be used for the particular service,
- a data rate to be used for the particular service,
- a quantity of subframes or time slots to be used for the particular service, or
- a modulation and coding scheme (MCS) index to be used for the particular service.

19. A device comprising:
- a memory to store instructions; and
- a processor to execute one or more of the instructions to:

receive, via one or more small cells within a venue, an electronic service guide (ESG), wherein the ESG comprises:
  an identifier of a program available to be received by the devices, and
  a first frequency band allocated to be used to receive the program when network conditions associated with a traffic load of the one or more small cells indicate that one or more traffic load values exceed corresponding threshold values related to at least one of:
    a size of the venue,
    a quantity of the one or more small cells, or
    a quantity of mobile devices receiving wireless communication service via the one or more small cells,
display a representation of the ESG,
receive a selection of the program by a user of the device,
identify the first frequency band based on the selection of the program,
determine whether the first frequency band is being used by the device, and
initiate an inter-frequency handoff in order to switch the device from a second frequency band to the first frequency band when the first frequency band is not being used by the device, wherein the first frequency band is different from the second frequency band, and
receive streams associated with the program via the first frequency band.

20. The device of claim 19,
where the first frequency band is an advanced wireless services (AWS) band,
where the device is within a venue, and
where the program is only distributed within the venue.

21. The device of claim 19, where the ESG further comprises:
  an identifier of a different program available to be received by the devices, and
  the second frequency band or a third frequency band to be used to receive the different program.

* * * * *